United States Patent [19]

Maier

[11] Patent Number: 4,922,621

[45] Date of Patent: May 8, 1990

[54] ANGLE GUIDE APPARATUS

[76] Inventor: Charles J. Maier, 3836 Sheridan Rd., Racine, Wis. 53403

[21] Appl. No.: 306,694

[22] Filed: Feb. 6, 1989

[51] Int. Cl.⁵ .............................................. B43L 7/06
[52] U.S. Cl. ...................................... 33/465; 33/451; 33/471
[58] Field of Search ................. 33/451, 469, 471, 497, 33/500, 465, 459

[56] References Cited

U.S. PATENT DOCUMENTS

| | | | |
|---|---|---|---|
| 596,818 | 1/1898 | Moore . | |
| 784,674 | 3/1905 | Haag | 33/451 |
| 992,722 | 5/1911 | Lindstrom | 33/451 |
| 1,000,133 | 8/1911 | Urbach | 33/451 |
| 1,014,402 | 1/1912 | Larsen | 33/465 |
| 1,033,742 | 7/1912 | Skates | 33/451 |
| 1,070,925 | 8/1913 | Seaman et al. | 33/451 |
| 1,086,545 | 2/1914 | Meister . | |
| 1,134,826 | 4/1915 | Eckre | 33/451 |
| 1,806,396 | 5/1931 | Hartwell . | |
| 1,908,518 | 5/1933 | Lee . | |
| 2,110,636 | 3/1938 | Sharp | 33/465 |
| 2,878,569 | 3/1959 | Metrulis | 33/88 |
| 3,522,657 | 8/1970 | Metrulis | 33/88 |
| 4,144,650 | 3/1979 | Rawlings et al. | 33/88 |
| 4,194,295 | 3/1980 | Simuro et al. | 33/458 |
| 4,394,801 | 7/1983 | Thibodeaux | 33/471 |
| 4,481,720 | 11/1984 | Sury | 33/451 |
| 4,745,689 | 5/1988 | Hiltz | 33/471 |

FOREIGN PATENT DOCUMENTS 19782  7/1899  Fed. Rep. of Germany ........ 33/451

Primary Examiner—Thomas B. Will
Attorney, Agent, or Firm—Peter N. Jansson, Ltd.

[57] ABSTRACT

An improved guide apparatus for replicating angles of the type having a main member with a straight edge, a bubble-level device on the main member, and an angle arm pivotably attached to the main member. A slot in an end of the main member receives the angle arm, and a bolt which extends through the main member and the angle arm to form a pivot point has a hand-tightening nut or the like on it for quick angle replication in direct and reverse angle situations without additional tools. In some preferred embodiments the slot extends through the entire main member and/or the opposite surfaces thereof are tapered at the pivot connection to facilitate tightening even though the main member is of substantially rigid construction.

15 Claims, 2 Drawing Sheets

ANGLE GUIDE APPARATUS

FIELD OF THE INVENTION

This invention relates to angle guide devices and, more particularly, to angle guide devices for replicating angles in construction operations and the like.

BACKGROUND OF THE INVENTION

In construction work, such as the carpentery involved in framing building structures, there is frequently a need for marking angle lines on members to be cut. In many situations the precise angle necessary is not readily determined and it is desirable to replicate an angle which has been assumed by another member already in place. This task may be done in a various ways using a variety of implements of the prior art. Each implement for tasks such as this, and a variety of other similar angle-marking tasks, is referred to herein as an angle guide apparatus.

Many different angle guides for this sort of purpose have been disclosed in the prior art. Some examples of such prior art devices include those disclosed in the following United States patents:
U.S. Pat. No. 596,818 (Moore)
U.S. Pat. No. 1,086,545 (Meister et al.)
U.S. Pat. No. 1,806,396 (Hartwell)
U.S. Pat. No. 1,908,518 (Lee)
U.S. Pat. No. 2,878,569 (Metrulis)
U.S. Pat. No. 3,522,657 (Metrulis)
U.S. Pat. No. 4,144,650 (Rawlings et al.)
U.S. Pat. No. 4,194,295 (Simuro et al.)

As can be seen readily, certain devices of the prior art include a main member with a main straight edge, a bubble-level device attached to the main member, and an angle arm with a proximal end pivotably attached to a proximal end of the main member, such angle arm having its own straight edge. Many different arrangements and structures have been used in such devices. Some have protractor elements useful for setting a predetermined angle. Others have spring and flat-spot arrangements which facilitate setting to certain predetermined angles. In one the angle arm may be fixed at any position by certain adjustments which require tools such as a screwdriver.

Each of the devices of the prior art of this general type has problems or disadvantages for the most common uses.

In some cases adjustment and readjustment of the angle between the angle arm and the main member is quite difficult, such adjustment requiring steps which are time-consuming and which require a number of manipulations. Such difficulties of operation can cause misadjustment of the angle, that is, a failure to properly replicate the angle to be replicated.

With certain other devices of the prior art operation may be particularly problematic when the devices are used in a symmetrical reverse-angle marking, that is, when duplicate angles which are symmetrical reversals of each other must be marked. In many such cases, a visual alignment of the main-member straight edge may be necessary for at least one of the symmetrical angle markings, and this can result in questionable reliability in the markings.

Some devices of the prior art are relatively weak and flimsy in construction to the extent that the degree of accuracy of markings can be compromised. This is contrary to the intended purpose of such devices. Yet, in very rigid constructions adjustment and readjustment of the angle, or, more specifically, releasably holding the angle at the chosen position, has required excessive manipulative steps with the attendant disadvantages.

A number of devices of the prior art are of complex and expensive construction. There is a clear need for an improved angle guide apparatus for convenient and easy replication of angles, both for direct and symmetrical reverse-angle markings, in construction operations and the like.

OBJECTS OF THE INVENTION

It is an object of this invention to provide an improved angle guide apparatus which overcomes certain problems and shortcomings of the prior art, including those mentioned above.

Another object of this invention is to provide an improved angle guide apparatus which is easy to operate on the job site.

Another object of this invention is to provide an improved angle guide apparatus which may be operated quickly with little or no risk of inaccuracy because of waivering during operation.

Another object of this invention is to provide an improved angle guide apparatus which may be readily operated without the use of auxilliary tools or excessive manipulations.

Another object of this invention is to provide an improved angle guide apparatus which has substantial rigidity in its main member, while being easily operable and of simple construction.

Another object of this invention is to provide an improved angle guide apparatus which may readily be used for a variety of angle markings, including symmetrical reverse-angle markings, with little or no inaccuracy in use.

These and other important objects will be apparent from the descriptions of this invention which follow.

SUMMARY OF THE INVENTION

This invention is an improved guide apparatus for angle replication in construction and the like which overcomes certain shortcomings and problems of the prior art, including those mentioned above. The guide apparatus of this invention is of the type having a main member with a main straight edge, a bubble-level device attached to the main member in alignment with the main straight edge, and an angle arm with its own straight edge and a proximal end which is pivotably attached to a proximal end of the main member.

In the invention the proximal end of the main member has a slot which divides the main-member proximal end portion into first and second opposed slot-defining portions. The slot receives the proximal end of the angle arm. A bolt extending through the slot-defining portions and the angle arm therebetween forms a pivot point for the angle arm and has a hand-tightening means on it for drawing the first and second opposed slot-defining portions of the main member against the angle arm to hold it in adjustment. With this device, angle replications can be carried out quickly and easily, without the use of any additional tool. The device may be used quickly and easily in both direct and reverse angle situations.

In highly preferred embodiments, the hand-tightening means is a finger-tightenable means. For example, a wing nut on the bolt or a thumb screw forming the bolt may be used to facilitate adjustment. Other finger-tightenable screw devices may be used instead.

In certain highly preferred embodiments, the guide apparatus of this invention has a slot in the main member which extends through the entire main-member proximal end, right through its opposite first and second edges. This facilitates flexing of the proximal end portion of the main member which allows tightening to be accomplished readily even though the main member is of sturdy construction.

An additional feature of this preferred embodiment, or an alternative preferred embodiment, involves the main member having opposite lateral surfaces which are spaced more closely to one another along the main-member proximal end than elsewhere along the length of the main member. This serves to allow tightening to be readily accomplished even though the main member is of sturdy construction. Such reduced surface-to-surface spacing preferably involves tapering of such opposite surfaces toward each other at positions progressively closer to the end of the proximal end.

The angle arm is itself, as in devices of the prior art, preferably a flat planar member. In certain preferred embodiments of this invention, the main straight edge of the main member is a planar surface which is normal to the angle arm, such planar surface and angle arm being arranged such that the straight edge of the angle arm, when it engages the planar surface, divides such planar surface along its length to form ledges of the planar surface on both sides of the arm. This allows symmetrical angles to readily be marked on opposite ends of a workpiece.

Each ledge preferably includes a flange which projects laterally beyond the main-member lateral surface. This provides ledges which are of sufficient width to facilitate engagement of the guide apparatus against a workpiece. Furthermore, such sufficient ledge space is provided without increasing the thickness of the main member to an extent which might make flexing of the main-member proximal end portion difficult, which could make release and securement of the angle arm during its adjustment difficult.

With a pair of such projecting flanges along both opposite edges of the main member, the two lateral surfaces of the main member are recessed. With the bubble-level device secured on the main member in such recessed position, it is in a position well protected from the abuse which can occur on a construction site or the like.

DETAILED DESCRIPTION OF PREFERRED EMBODIMENT

Figure 1:
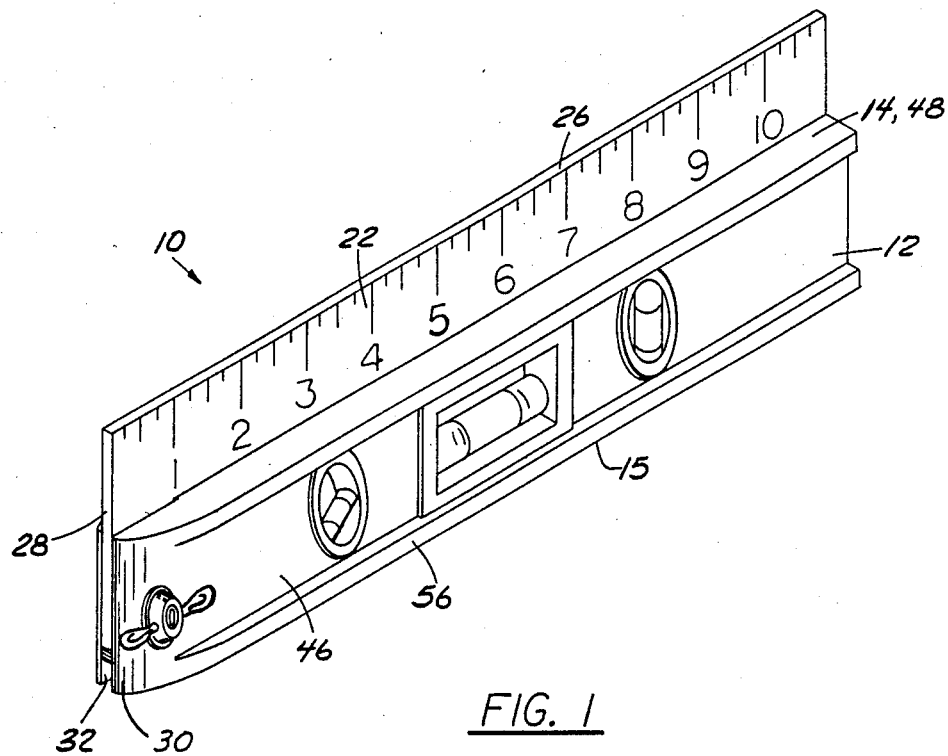
FIG. 1 is a perspective view of an angle guide apparatus in accordance with a preferred embodiment of this invention, with its angle arm in closed position.
Figure 2:
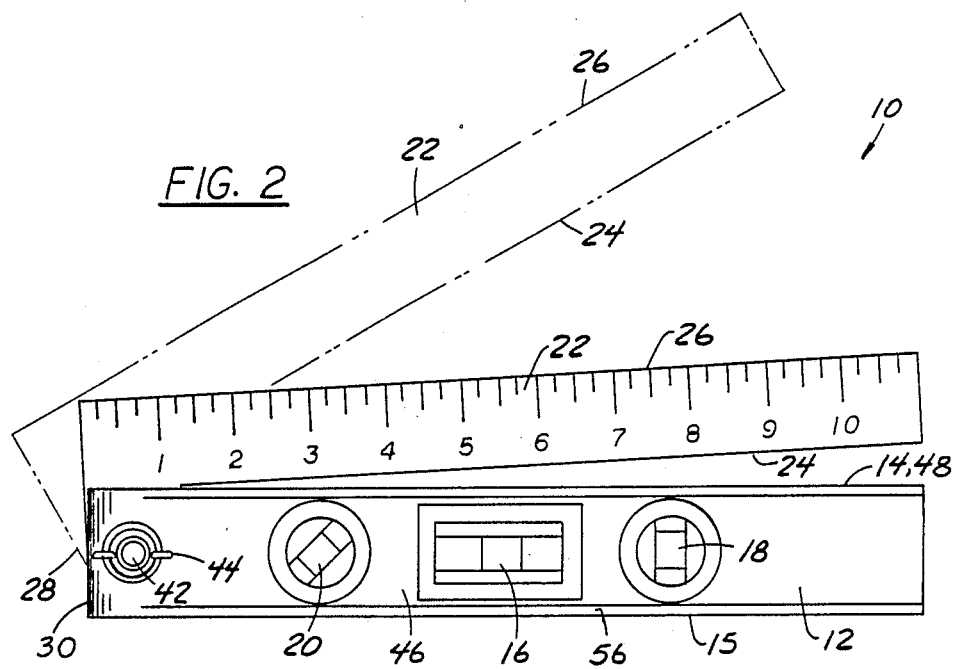
FIG. 2 is a front elevation with the angle arm in partially raised position.

The figures illustrate a preferred angle guide apparatus 10 for replicating angles in construction operations and the like. Angle guide apparatus 10 includes a main member 12 with bubble-level devices 16, 18 and 20 thereon and an angle arm 22 pivotably connected thereto. Main member 12 has a first or main straight edge 14 and an opposite second straight edge 15, and angle arm 22 has a proximal straight edge 24 and a distal straight edge 26. Angle arm 22 has a proximal end 28 by which angle arm 22 is pivotably attached to a proximal end 30 of main member 12.

Figure 4:
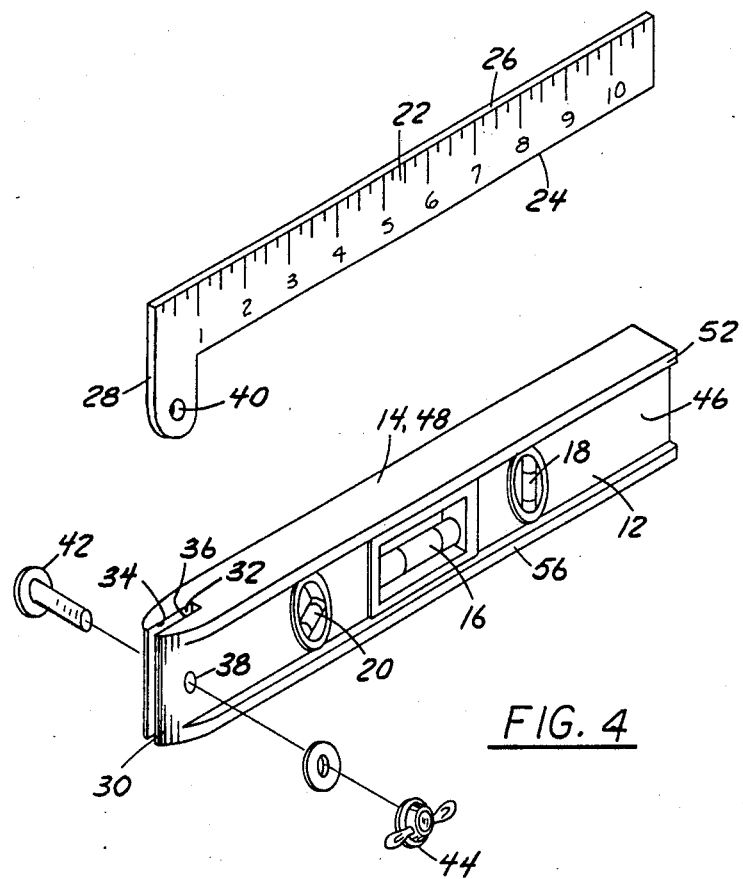
FIG. 4 is an exploded perspective view.
Figure 3:
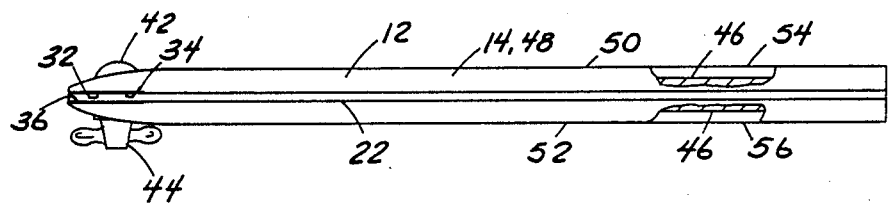
FIG. 3 is a top view of FIG. 2, partially broken away.

As illustrated best in FIG. 4, main member 12 has a slot 32 at its proximal end portion 30. First and second opposed slot-defining portions 34 and 36 form slot 32. Proximal end 28 of angle arm 22 is received within slot 32. Holes 38 are formed in each of the first and second slot-defining portions 34 and 36 and a hole 40 is formed in angle arm 22. A bolt 42 extends through holes 38, 40 and 38 and forms a pivot for the pivoting motion of angle arm 22 with respect to main member 12.

Bolt 42 has a hand-tightening means thereon for drawing first and second opposed slot-defining portions 34 and 36 of main-member proximal portion 30 against angle arm 22. Such hand-tightening means greatly facilitates angle replications, allowing such replications to be carried out quickly and easily, without additional tools, and in direct and reverse-angle situations.

The hand-tightening means which is illustrated is a wing nut 44 which is engaged on bolt 42. Wing nut 44 may be tightened and loosened quickly and easily by simple finger-engagement. Other finger-tightenable devices, such as thumb screws, could be used as well.

Main member 12 is of substantially rigid construction having a sufficient thickness dimension, between its opposite lateral surfaces 46, to provide such rigidity. Such rigidity makes the device rugged to resist damage on the job site. Slot 32 extends from first or main straight edge 14 entirely through main-member proximal end 30 and second straight edge 15 of main member 12. Despite the sturdy rigid construction of main member 12, the extending of slot 32 entirely through main member proximal end 30 allows first and second slot-defining portions 34 and 36 to flex sufficiently such that the hand-tightening means (wing nut 44) described above allows ready gripping and releasing of angle arm 22 during use.

Furthermore, opposite lateral surfaces 46 of main member 12 are tapered toward one another along main member proximal end 30. This reduced surface-to-surface spacing at positions progressively closed to the end of main member 12 helps provide the level of flexibility in first and second slot-defining portions 34 and 36 to facilitate easy adjustment of the angle of angle arm 22 with respect to main member 12.

Angle arm 22 is a flat planar member. Main straight edge 14 of main member 12 is itself a planar surface 48 which is normal (that is, perpendicular) to angle arm 22. Proximal straight edge 24 of angle arm 22, when angle arm 22 is in its closed position, engages and divides planar surface 48 along the length of main member 12. Thus, angle arm 22 forms opposite ledges 50 and 52 of planar surface 48, one on each side of angle arm 22. This construction facilitates symmetrical reverse-angle markings, such as may be made on opposite ends of a workpiece. With this configuration, a single angle adjustment may be made and then replicated with ease in both direct and reverse form.

Each ledges 50 and 52 includes a flange, such flanges projecting beyond their respective lateral surfaces 46 of main member 12. A pair of similar flanges 54 and 56 along second straight edge 15 of main member 12, like the flanges at ledges 50 and 52, project laterally beyond lateral surfaces 46. Bubble-level devices 16, 18 and 20 are each secured to main member 12 between the pairs of flanges along the first and second straight edges of main member 12. Thus, bubble-level devices 16, 18 and 20 are recessed on main member 12 such that they are well protected from abuse which can occur on a job site.

The angle guide apparatus 10 is preferably made of study rigid materials such as aluminum or steel. However, certain sturdy plastic materials, such as nylon or lexan, and a wide variety of other materials would be acceptable. Appropriate design and assembly methods would be apparent to those skilled in the art who are familiar with this invention.

One example of operation of angle guide apparatus 10 may be described as follows:

In a situation in which framing lumber is to be angle cut at its opposite ends such that it matches the angle of an existing roof-line structure, distal straight edge 26 of angle arm 22 is held against the angled structure with wing nut 44 loosened to facilitate angle adjustment. Then main member 12 is raised or lowered until bubble-level device 16 indicates that main member 12 is level. Since apparatus 10 was held by the hand of the user at proximal edge portions 28 and 30, wing nut 44 can easily be finger-tightened by the user without significant movement which might bring main member 12 to an improper angle with respect to angle arm 12.

Then, with angle arm in the appropriate fixed angular position with respect to main member 12, angle guide apparatus 10 is placed across the workpiece to be cut, with ledge 50 against the workpiece to assure proper alignment therewith. A line is drawn across the workpiece using proximal straight edge 24. After this line is drawn, the apparatus is flipped over and moved to the opposite end of the workpiece. There apparatus 10 engages the workpiece with ledge 52 against the workpiece to assure alignment therewith. Again, a line is drawn across the workpiece using proximal straight edge 24.

While the principles of this invention have been described in connection with specific embodiments, it should be understood clearly that these descriptions are made only by way of example and are not intended to limit the scope of the invention.

I claim:

1. In a guide apparatus for replicating angles in construction of the type having a main member with a main straight edge, a bubble-level device attached to the main member in alignment with the main straight edge, and an angle arm with a proximal end pivotably attached to a proximal end of the main member, the angle arm having at least one arm straight edge, the improvement comprising:

the angle arm having a flat planar main portion with said at least one straight edge including parallel distal and proximal straight edges, and an offset end portion of the angle arm proximal end extending substantially perpendicularly from the main portion across said proximal straight edge;

the proximal end of the main member having a slot forming first and second opposed slot-defining portions and receiving the offset end portion of the angle arm;

a bolt extending through both of the slot-defining portions and the angle arm offset portion therebetween, at a position on said offset portion spaced beyond the angle arm proximal edge, the bolt forming a pivot point for the angle arm and having hand-tightening means thereon for drawing the first and second opposed slot-defining portions against the angle arm; and the main straight edge of the main member being a planar surface normal to the angle arm planar main portion, said angle arm proximal straight edge engaging and dividing said main member planar surface along its length to form ledges of said planar surface on both sides of the angle arm, said angle arm and main portion planar surface dimensioned such that said ledges are of sufficient width to assure proper engagement with surfaces of typical construction lumber normal to said planar main portion of said angle arm, whereby angle replications can be carried out quickly and easily, without additional tools, and in reverse angle situations.

2. The guide apparatus of claim 1 wherein the hand-tightening means is a finger-tightenable means.

3. The guide apparatus of claim 1 wherein the main member has first and second edges and the slot extends through the entire main-member proximal end including the first and second edges, whereby tightening may readily be accomplished even though the main member is of sturdy construction.

4. The guide apparatus of claim 3 wherein the hand-tightening means is a finger-tightenable means.

5. The guide apparatus of claim 1 wherein the main member has opposite lateral surfaces and such opposite surfaces are spaced more closely to one another along the main-member proximal end, whereby tightening may readily be accomplished even though the main member is of sturdy construction.

6. The guide apparatus of claim 5 wherein the opposite surfaces are tapered together along the main-member proximal end.

7. The guide apparatus of claim 6 wherein the hand-tightening means is a finger-tightenable means.

8. The guide apparatus of claim 5 wherein the opposite surfaces are tapered together along the main-member proximal end.

9. The guide apparatus of claim 8 wherein the hand-tightening means is a finger-tightenable means.

10. The guide apparatus of claim 1 wherein:
the main member has opposite lateral surfaces; and
the ledges include flanges projecting laterally beyond their respective lateral surfaces.

11. The guide apparatus of claim 10 wherein:
the main member has first and second edges, the projecting flanges being along the first edge;
the second edge has similar projecting flanges such that each lateral surface is recessed; and
the bubble-level device on the main member is recessed, whereby it is better protected from abuse.

12. The guide apparatus of claim 11 wherein the slot extends through the entire main-member proximal end including the first and second edges, whereby tightening may readily be accomplished even though the main member is of sturdy construction.

13. The guide apparatus of claim 12 wherein the opposite lateral surfaces are spaced more closely to one another along the main-member proximal end, whereby tightening may readily be accomplished even though the main member is of sturdy construction.

14. The guide apparatus of claim 13 wherein the opposite surfaces are tapered together along the main-member proximal end.

15. The guide apparatus of claim 14 wherein the hand-tightening means is a flange-tightenable means.

* * * * *